United States Patent
Lee et al.

(10) Patent No.: US 9,906,997 B2
(45) Date of Patent: Feb. 27, 2018

(54) METHOD AND APPARATUS FOR TRANSMITTING INACTIVITY INDICATION IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 14/773,744

(22) PCT Filed: Apr. 23, 2014

(86) PCT No.: PCT/KR2014/003572
§ 371 (c)(1),
(2) Date: Sep. 8, 2015

(87) PCT Pub. No.: WO2014/175665
PCT Pub. Date: Oct. 30, 2014

(65) Prior Publication Data
US 2016/0037401 A1     Feb. 4, 2016

Related U.S. Application Data

(60) Provisional application No. 61/815,230, filed on Apr. 23, 2013.

(51) Int. Cl.
*H04W 36/00* (2009.01)
*H04W 36/18* (2009.01)
*H04W 36/14* (2009.01)

(52) U.S. Cl.
CPC ... *H04W 36/0066* (2013.01); *H04W 36/0055* (2013.01); *H04W 36/14* (2013.01); *H04W 36/18* (2013.01)

(58) Field of Classification Search
CPC ......... H04W 36/0066; H04W 36/0055; H04W 36/14; H04W 36/18
See application file for complete search history.

(56) References Cited

U.S. PATENT DOCUMENTS

| | | |
|---|---|---|
| 8,249,643 B1 | 8/2012 | Tailor et al. |
| 2011/0223919 A1 | 9/2011 | Vikberg et al. |

(Continued)

FOREIGN PATENT DOCUMENTS

| | | |
|---|---|---|
| WO | 2012/130308 | 10/2012 |
| WO | 2013/009892 | 1/2013 |

OTHER PUBLICATIONS

PCT International Application No. PCT/KR2014/003572, Written Opinion of the International Searching Authority dated Jun. 27, 2014, 1 page.

(Continued)

*Primary Examiner* — Ian N Moore
*Assistant Examiner* — Latresa McCallum
(74) *Attorney, Agent, or Firm* — Lee Hong Degerman Kang Waimey

(57) ABSTRACT

A method and apparatus for transmitting an inactivity indication in a wireless communication system is provided. A user equipment (UE), which transmits/receives Internet protocol (IP) packets of a specific bearer/channel via a first connection with a first node, establishes a second connection with a second node while maintaining the first connection. When the specific bearer/channel is moved from the first node to the second node, the UE transmits an inactivity indication which indicates inactivation of the specific bearer/channel to the first node.

13 Claims, 16 Drawing Sheets

(56) References Cited

U.S. PATENT DOCUMENTS

| | | | |
|---|---|---|---|
| 2012/0176950 A1* | 7/2012 | Zhang | H04L 5/001 370/311 |
| 2012/0218897 A1* | 8/2012 | Aramoto | H04W 36/0027 370/235 |
| 2012/0264416 A1 | 10/2012 | Pica et al. | |
| 2013/0070596 A1 | 3/2013 | Yeh et al. | |
| 2013/0094523 A1* | 4/2013 | Shen | H04J 3/0658 370/503 |
| 2016/0007352 A1* | 1/2016 | Qu | H04W 72/0486 370/329 |

OTHER PUBLICATIONS

Catt, "UE Context Transfer and the CN Signalling for Different Traffic Types", 3GPP TSG RAN WG2 Meeting #81bis, R2-130980, Apr. 5, 2013, 3 pages.

European Patent Office Application No. 14788912.5, Search Report dated Oct. 20, 2016, 8 pages.

* cited by examiner

METHOD AND APPARATUS FOR TRANSMITTING INACTIVITY INDICATION IN WIRELESS COMMUNICATION SYSTEM

CROSS-REFERENCE TO RELATED APPLICATIONS

This application is the National Stage filing under 35 U.S.C. 371 of International Application No. PCT/KR2014/003572, filed on Apr. 23, 2014, which claims the benefit of U.S. Provisional Application No. 61/815,230, filed on Apr. 23, 2013, the contents of which are all hereby incorporated by reference herein in their entirety.

BACKGROUND OF THE INVENTION

Field of the Invention

The present invention relates to wireless communications, and more specifically, to a method and apparatus for transmitting an inactivity indication in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

3GPP/wireless local area network (WLAN) interworking has been discussed. 3GPP/WLAN interworking may be called traffic steering. From rel-8 of 3GPP LTE, access network discovery and selection functions (ANDSF) for detecting and selecting accessible access networks have been standardized while interworking with non-3GPP access (e.g., WLAN) is introduced. The ANDSF may carry detection information of access networks accessible in location of a user equipment (UE) (e.g., WLAN, WiMAX location information, etc), inter-system mobility policies (ISMP) which is able to reflect operator's policies, and inter-system routing policy (ISRP). Based on the information described above, the UE may determine which IP traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for the 3GPP LTE will focus on additional functionalities for enhanced performance in hotspot areas for indoor and outdoor using low power nodes.

For one feature of small cell enhancements, dual connectivity may be introduced. Dual connectivity is an operation where a given user equipment (UE) consumes radio resources provided by at least two different network points connected with non-ideal backhaul. Furthermore, each eNB involved in dual connectivity for a UE may assume different roles. Those roles do not necessarily depend on the eNB's power class and may vary among UEs.

If dual connectivity is supported, a specific traffic may be transferred from one connection to the other connection, and accordingly, the connection from which the specific traffic is transferred may be inactive. In this situation, it may be inefficient to maintain two connections. Accordingly, a method for managing connections in dual connectivity efficiently may be required.

SUMMARY OF THE INVENTION

The present invention provides a method and apparatus for transmitting an inactivity indication in a wireless communication system. The present invention provides a method for transmitting an inactivity indication which indicates inactivation of a specific bearer/channel in dual connectivity.

In an aspect, a method for transmitting, by a user equipment (UE), an inactivity indication in a wireless communication system is provided. The method includes performing transmission or reception of Internet protocol (IP) packets of a specific path via a first connection with a first node, establishing a second connection with a second node while maintaining the first connection, moving the specific path from the first node to the second node, and transmitting an inactivity indication which indicates inactivation of the specific path to the first node.

The inactivity indication may be transmitted via one of a resource control resource (RRC) message, media access control (MAC) control element (CE), or a L1 signaling.

The inactivity indication may include an identity of the specific path.

The specific path may be a specific bearer. The specific bearer may be one of a radio bearer, evolved packet system (EPS) bearer, or an IP flow.

The specific path may be a specific channel. The specific channel may be one of a logical channel, a transport channel, or a physical channel.

The UE may support dual connectivity.

The first node and the second node may be eNodeBs (eNBs) of a 3rd generation partnership project (3GPP) long-term evolution (LTE) system. The first node may be a master eNB (MeNB), and the second node may be a secondary eNB (SeNB).

The first node may be an eNB of a 3GPP LTE system, and the second node may be an access point (AP) of a wireless local area network (WLAN) system.

The first node may be an AP of a WLAN system, and the second node may be an eNB of a 3GPP LTE system.

The method may further include performing an RRC connection reconfiguration procedure with the first node.

The method may further include performing an RRC connection release procedure with the first node.

In another aspect, a user equipment (UE) in a wireless communication system is provided. The UE includes a radio frequency (RF) unit for transmitting or receiving a radio signal, and a processor coupled to the RF unit, and configured to perform transmission or reception of Internet protocol (IP) packets of a specific path via a first connection with a first node, establish a second connection with a second node while maintaining the first connection, move the specific path from the first node to the second node, and transmit an inactivity indication which indicates inactivation of the specific path to the first node.

Connections in dual connectivity can be managed efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
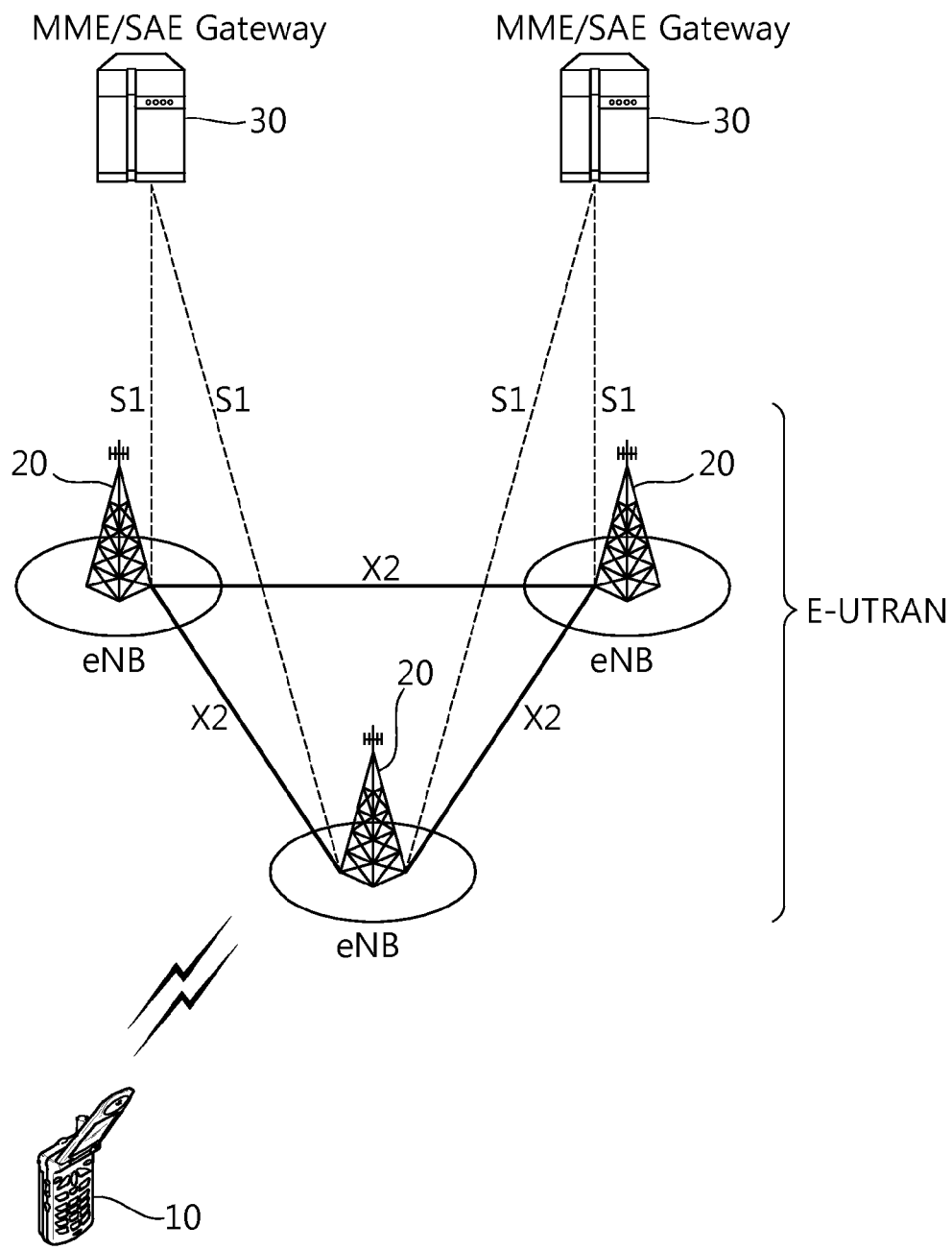
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
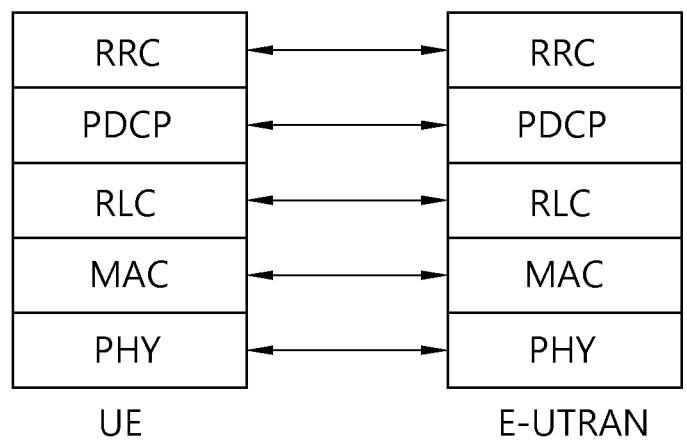
FIG. 2 shows a control plane of a radio interface protocol of an LTE system.
Figure 3:
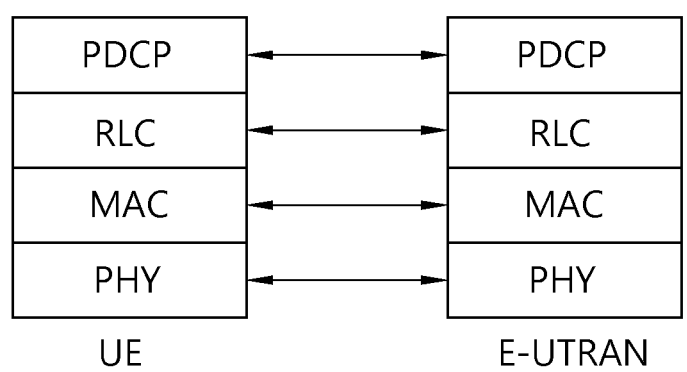
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
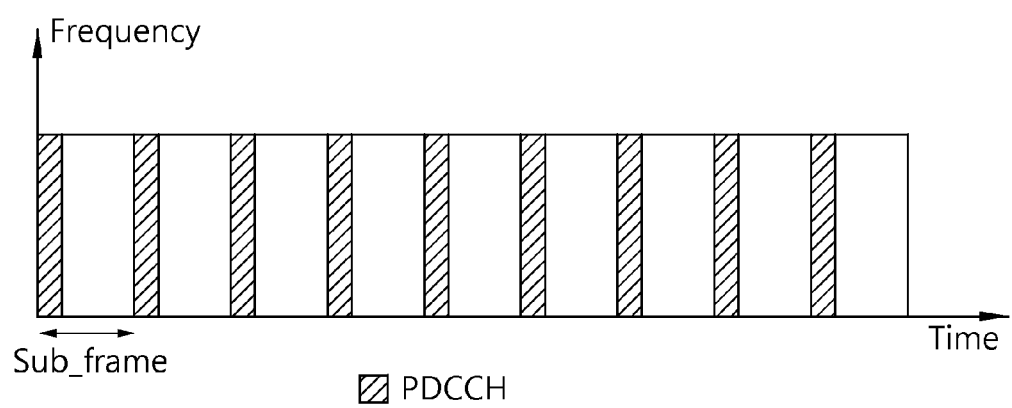
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID)

which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped to the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−$Rx$Pilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

Wi-Fi protocols are described. Wi-Fi is a popular technology that allows an electronic device to exchange data wirelessly (using radio waves) over a computer network, including high-speed Internet connections. The Wi-Fi Alliance defines Wi-Fi as any "wireless local area network (WLAN) products that are based on the IEEE 802.11 standards". However, since most modern WLANs are based on these standards, the term "Wi-Fi" is used in general English as a synonym for "WLAN".

A device that can use Wi-Fi (such as a personal computer, video-game console, smartphone, tablet, or digital audio player) can connect to a network resource such as the Internet via a wireless network access point. Such an access point (or hotspot) has a range of about 20 meters (65 feet) indoors and a greater range outdoors. Hotspot coverage can comprise an area as small as a single room with walls that block radio waves or as large as many square miles—this is achieved by using multiple overlapping access points.

"Wi-Fi" is a trademark of the Wi-Fi Alliance and the brand name for products using the IEEE 802.11 family of standards. Only Wi-Fi products that complete Wi-Fi Alliance interoperability certification testing successfully may use the "Wi-Fi CERTIFIED" designation and trademark.

Wi-Fi has had a checkered security history. Its earliest encryption system, wired equivalent privacy (WEP), proved easy to break. Much higher quality protocols, Wi-Fi protected access (WPA) and WPA2, were added later. However, an optional feature added in 2007, called Wi-Fi protected setup (WPS), has a flaw that allows a remote attacker to recover the router's WPA or WPA2 password in a few hours on most implementations. Some manufacturers have recommended turning off the WPS feature. The Wi-Fi Alliance has since updated its test plan and certification program to ensure all newly certified devices resist brute-force AP PIN attacks.

The 802.11 family consist of a series of half-duplex over-the-air modulation techniques that use the same basic protocol. The most popular are those defined by the 802.11b and 802.11g protocols, which are amendments to the original standard. 802.11-1997 was the first wireless networking standard, but 802.11b was the first widely accepted one, followed by 802.11g and 802.11n. 802.11n is a new multi-streaming modulation technique. Other standards in the family (c-f, h, j) are service amendments and extensions or corrections to the previous specifications.

802.11b and 802.11g use the 2.4 GHz ISM band, operating in the United States under Part 15 of the US Federal Communications Commission Rules and Regulations. Because of this choice of frequency band, 802.11b and g equipment may occasionally suffer interference from microwave ovens, cordless telephones and Bluetooth devices. 802.11b and 802.11g control their interference and susceptibility to interference by using direct-sequence spread spectrum (DSSS) and OFDM signaling methods, respectively. 802.11a uses the 5 GHz U-NII band, which, for much of the world, offers at least 23 non-overlapping channels rather than the 2.4 GHz ISM frequency band, where adjacent channels overlap. Better or worse performance with higher or lower frequencies (channels) may be realized, depending on the environment.

The segment of the radio frequency spectrum used by 802.11 varies between countries. In the US, 802.11a and 802.11g devices may be operated without a license, as allowed in Part 15 of the FCC Rules and Regulations. Frequencies used by channels one through six of 802.11b and 802.11g fall within the 2.4 GHz amateur radio band. Licensed amateur radio operators may operate 802.11b/g devices under Part 97 of the FCC Rules and Regulations, allowing increased power output but not commercial content or encryption.

Figure 5:
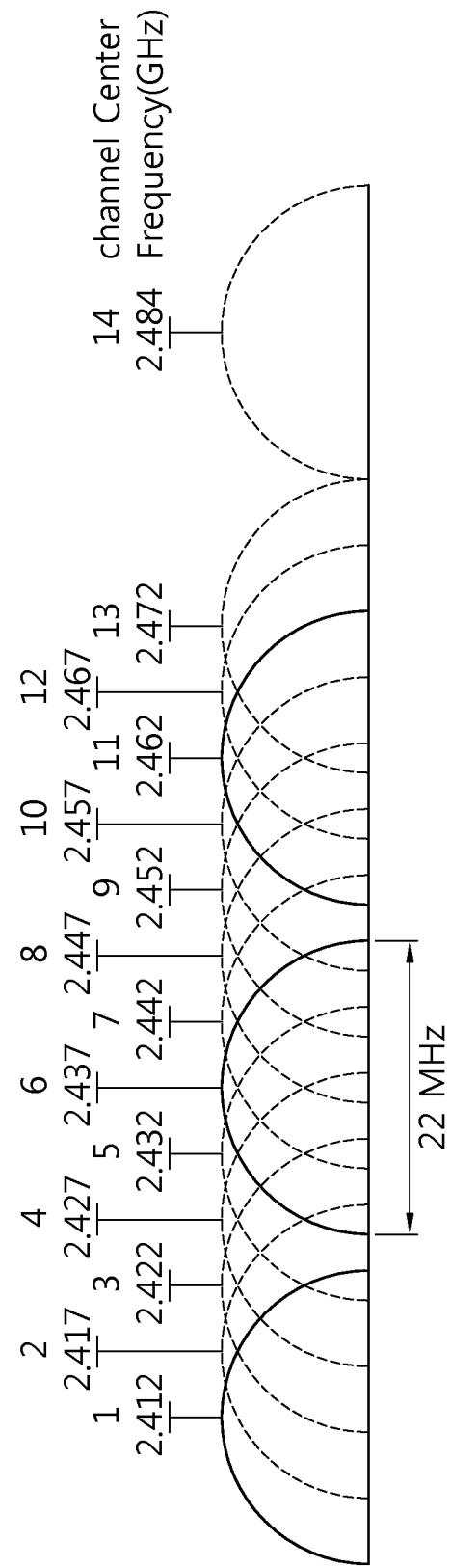
FIG. 5 shows a graphical representation of Wi-Fi channels in 2.4 GHz band.

FIG. 5 shows a graphical representation of Wi-Fi channels in 2.4 GHz band.

802.11 divides each of the above-described bands into channels, analogous to the way radio and TV broadcast bands are sub-divided. For example the 2.4000-2.4835 GHz band is divided into 13 channels spaced 5 MHz apart, with channel 1 centered on 2.412 GHz and 13 on 2.472 GHz (to which Japan added a $14^{th}$ channel 12 MHz above channel 13 which was only allowed for 802.11b). 802.11b was based on DSSS with a total channel width of 22 MHz and did not have steep skirts. Consequently only three channels do not overlap. Even now, many devices are shipped with channels 1, 6 and 11 as preset options even though with the newer 802.11g standard there are four non-overlapping channels—1, 5, 9 and 13. There are now four because the OFDM modulated 802.11g channels are 20 MHz wide.

Availability of channels is regulated by country, constrained in part by how each country allocates radio spectrum to various services. At one extreme, Japan permits the use of all 14 channels for 802.11b, while other countries such as Spain initially allowed only channels 10 and 11, and France only allowed 10, 11, 12 and 13. They now allow channels 1 through 13. North America and some Central and South American countries allow only 1 through 11.

In addition to specifying the channel centre frequency, 802.11 also specifies a spectral mask defining the permitted power distribution across each channel. The mask requires the signal be attenuated a minimum of 20 dB from its peak amplitude at ±11 MHz from the centre frequency, the point at which a channel is effectively 22 MHz wide. One consequence is that stations can only use every fourth or fifth channel without overlap, typically 1, 6 and 11 in the Americas, and in theory, 1, 5, 9 and 13 in Europe although 1, 6, and 11 is typical there too. Another is that channels 1-13 effectively require the band 2.401-2.483 GHz, the actual allocations being, for example, 2.400-2.4835 GHz in the UK, 2.402-2.4735 GHz in the US, etc.

Most Wi-Fi devices default to regdomain 0, which means least common denominator settings, i.e., the device will not transmit at a power above the allowable power in any nation, nor will it use frequencies that are not permitted in any nation.

The regdomain setting is often made difficult or impossible to change so that the end users do not conflict with local regulatory agencies such as the Federal Communications Commission.

Current 802.11 standards define "frame" types for use in transmission of data as well as management and control of wireless links.

Frames are divided into very specific and standardized sections. Each frame consists of a MAC header, payload and frame check sequence (FCS). Some frames may not have the payload. The first two bytes of the MAC header form a frame control field specifying the form and function of the frame. The frame control field is further subdivided into the following sub-fields:

- Protocol Version: two bits representing the protocol version. Currently used protocol version is zero. Other values are reserved for future use.
- Type: two bits identifying the type of WLAN frame. Control, data and management are various frame types defined in IEEE 802.11.
- Sub Type: Four bits providing addition discrimination between frames. Type and Sub type together to identify the exact frame.
- ToDS and FromDS: Each is one bit in size. They indicate whether a data frame is headed for a distribution system. Control and management frames set these values to zero. All the data frames will have one of these bits set. However communication within an independent basic service set (IBSS) network always set these bits to zero.
- More Fragments: The More Fragments bit is set when a packet is divided into multiple frames for transmission. Every frame except the last frame of a packet will have this bit set.
- Retry: Sometimes frames require retransmission, and for this there is a Retry bit which is set to one when a frame is resent. This aids in the elimination of duplicate frames.
- Power Management: This bit indicates the power management state of the sender after the completion of a frame exchange. Access points are required to manage the connection and will never set the power saver bit.
- More Data: The More Data bit is used to buffer frames received in a distributed system. The access point uses this bit to facilitate stations in power saver mode. It indicates that at least one frame is available and addresses all stations connected.
- WEP: The WEP bit is modified after processing a frame. It is toggled to one after a frame has been decrypted or if no encryption is set it will have already been one.
- Order: This bit is only set when the "strict ordering" delivery method is employed. Frames and fragments are not always sent in order as it causes a transmission performance penalty.

The next two bytes are reserved for the Duration ID field. This field can take one of three forms: Duration, Contention-Free Period (CFP), and Association ID (AID).

An 802.11 frame can have up to four address fields. Each field can carry a MAC address. Address 1 is the receiver, Address 2 is the transmitter, Address 3 is used for filtering purposes by the receiver.

- The Sequence Control field is a two-byte section used for identifying message order as well as eliminating duplicate frames. The first 4 bits are used for the fragmentation number and the last 12 bits are the sequence number.
- An optional two-byte Quality of Service control field which was added with 802.11e.
- The Frame Body field is variable in size, from 0 to 2304 bytes plus any overhead from security encapsulation and contains information from higher layers.
- The frame check sequence (FCS) is the last four bytes in the standard 802.11 frame. Often referred to as the cyclic redundancy check (CRC), it allows for integrity check of retrieved frames. As frames are about to be sent the FCS is calculated and appended. When a station receives a frame it can calculate the FCS of the frame and compare it to the one received. If they match, it is assumed that the frame was not distorted during transmission.

Management frames allow for the maintenance of communication. Some common 802.11 subtypes include:

- Authentication frame: 802.11 authentication begins with the wireless network interface controller (WNIC) sending an authentication frame to the access point containing its identity. With an open system authentication the WNIC only sends a single authentication frame and the access point responds with an authentication frame of its own indicating acceptance or rejection. With shared key authentication, after the WNIC sends its initial authentication request it will receive an authentication frame from the access point containing challenge text. The WNIC sends an authentication frame containing the encrypted version of the challenge text to the access point. The access point ensures the text was encrypted with the correct key by decrypting it with its own key. The result of this process determines the WNIC's authentication status.
- Association request frame: sent from a station it enables the access point to allocate resources and synchronize. The frame carries information about the WNIC including supported data rates and the SSID of the network the station wishes to associate with. If the request is accepted, the access point reserves memory and establishes an association ID for the WNIC.
- Association response frame: sent from an access point to a station containing the acceptance or rejection to an association request. If it is an acceptance, the frame will contain information such an association ID and supported data rates.
- Beacon frame: Sent periodically from an access point to announce its presence and provide the SSID, and other parameters for WNICs within range.
- Deauthentication frame: sent from a station wishing to terminate connection from another station.
- Disassociation frame: sent from a station wishing to terminate connection. It's an elegant way to allow the access point to relinquish memory allocation and remove the WNIC from the association table.
- Probe request frame: sent from a station when it requires information from another station.
- Probe response frame: sent from an access point containing capability information, supported data rates, etc., after receiving a probe request frame.
- Reassociation request frame: A WNIC sends a reassociation request when it drops from range of the currently associated access point and finds another access point with a stronger signal. The new access point coordinates the forwarding of any information that may still be contained in the buffer of the previous access point.
- Reassociation response frame: sent from an access point containing the acceptance or rejection to a WNIC reassociation request frame. The frame includes information required for association such as the association ID and supported data rates.

Control frames facilitate in the exchange of data frames between stations. Some common 802.11 control frames include:

- Acknowledgement (ACK) frame: After receiving a data frame, the receiving station will send an ACK frame to the sending station if no errors are found. If the sending station doesn't receive an ACK frame within a predetermined period of time, the sending station will resend the frame.

Request to send (RTS) frame: The RTS and CTS frames provide an optional collision reduction scheme for access points with hidden stations. A station sends a RTS frame to as the first step in a two-way handshake required before sending data frames.

Clear to send (CTS) frame: A station responds to an RTS frame with a CTS frame. It provides clearance for the requesting station to send a data frame. The CTS provides collision control management by including a time value for which all other stations are to hold off transmission while the requesting stations transmits.

Data frames carry packets from web pages, files, etc., within the body, using RFC 1042 encapsulation and EtherType numbers for protocol identification.

The BSS is the basic building block of an 802.11 wireless LAN. In infrastructure mode, a single AP together with all associated stations (STAs) is called a BSS. This is not to be confused with the coverage of an access point, which is called basic service area (BSA). The access point acts as a master to control the stations within that BSS. The simplest BSS consists of one access point and one station. In ad hoc mode, a set of synchronized stations (one of which acts as master) forms a BSS.

With 802.11, it is possible to create an ad-hoc network of client devices without a controlling access point; the result is called an IBSS.

Each BSS is uniquely identified by what's called a basic service set identification (BSSID). For a BSS operating in infrastructure mode, the BSSID is the MAC address of the wireless access point (WAP). For an IBSS, the BSSID is a locally administered MAC address generated from a 46-bit random number. The individual/group bit of the address is set to 0 (individual). The universal/local bit of the address is set to 1 (local).

A BSSID with a value of all is used to indicate the broadcast BSSID, which may only be used during probe requests.

An extended service set (ESS) is a set of one or more interconnected BSSs and integrated local area networks that appear as a single BSS to the logical link control layer at any station associated with one of those BSSs. The BSSs may work on the same channel, or work on different channels to boost aggregate throughput.

Each ESS is identified by a service set identifier (SSID). For an IBSS, the SSID is chosen by the client device that starts the network, and broadcasting of the SSID is performed in a pseudo-random order by all devices that are members of the network. The maximum length of the SSID is currently 32 bytes long.

Small cell enhancement is described. It may be referred to 3GPP TR 36.932 V12.0.0 (2012-12).

Figure 6:
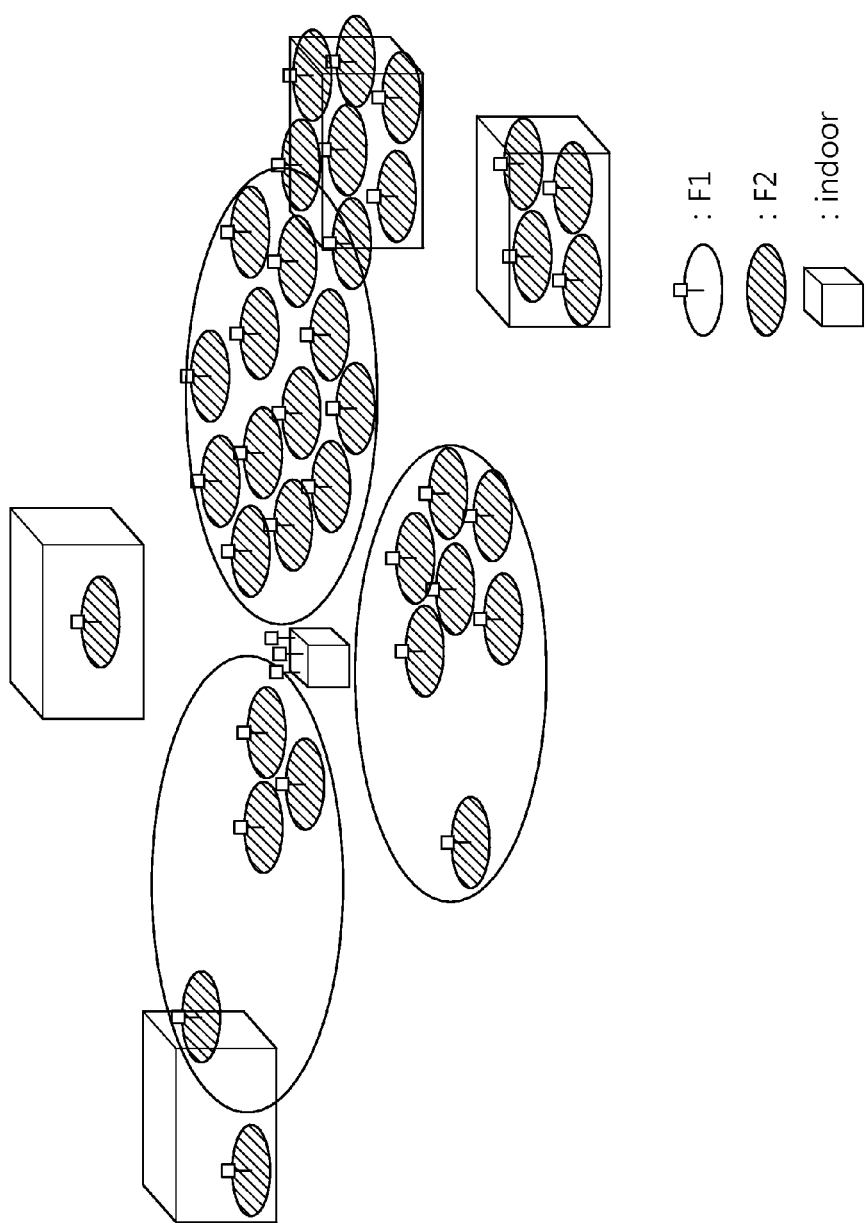
FIG. 6 shows deployment scenarios of small cells with/without macro coverage.

FIG. 6 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 6, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:

where the UE is in coverage of both the macro cell and the small cell simultaneously where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell scenarios for evaluation are described.

Figure 7:
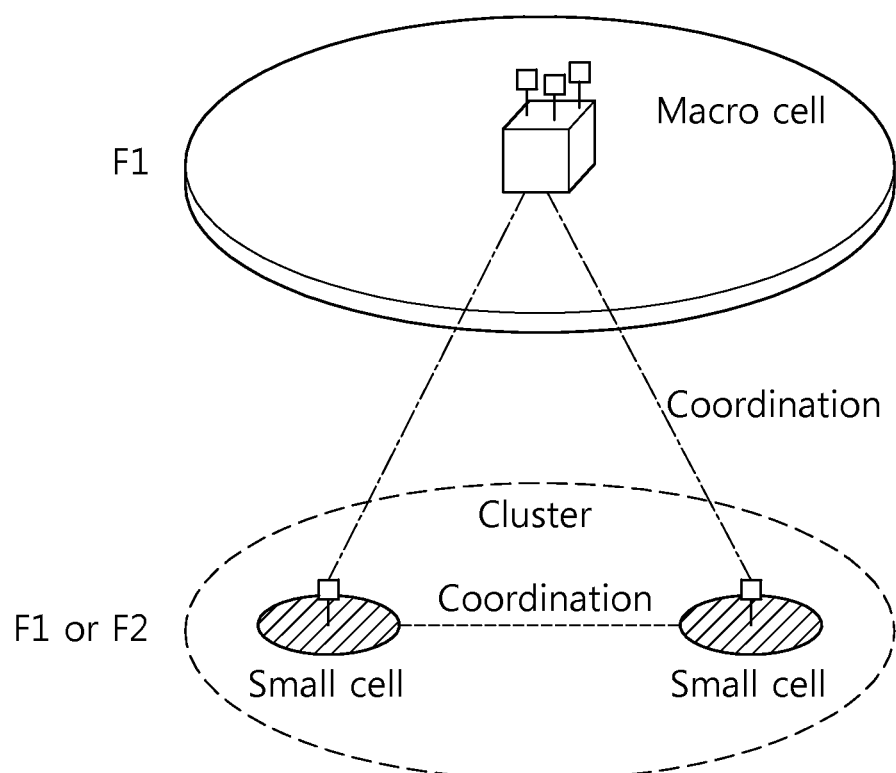
FIG. 7 shows an example of small cell deployment scenario for evaluation.

FIG. 7 shows an example of small cell deployment scenario for evaluation. The small cell deployment scenario described in FIG. 7 is a common design for small cell scenarios for evaluation purpose. It is noted that the addition of scenarios for evaluation of higher-layer aspects may be considered depending on the outcome of the higher-layer studies. Referring to FIG. 7, a macro cell may operate at frequency F1. An overlaid macro cell may be present or not. Small cells, which constitute a small cell cluster, may operate at frequency F1 or F2. The small cells in the small cell cluster may coordinate with each other. The macro cell and the small cells may coordinate with each other.

Figure 8:
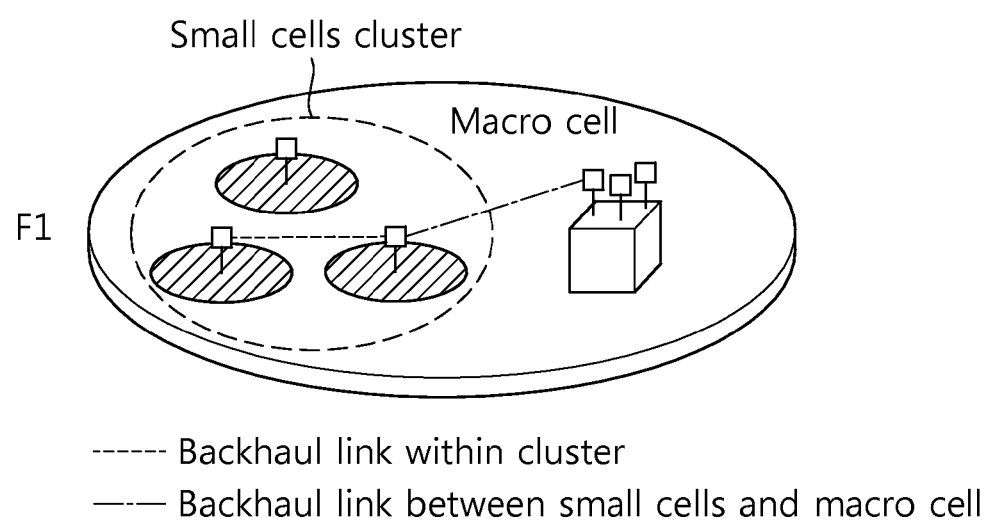
FIG. 8 shows an example of small cell deployment scenario.

FIG. 8 shows an example of small cell deployment scenario. Referring to FIG. 8, small cells are deployed in the presence of an overlaid macro network. The macro cell and the small cells are deployed using the same frequency, i.e., F1. Further, the macro cell and the small cells are deployed in outdoor. Users may be distributed both for outdoor and indoor. Further, a small cell cluster may be considered. The small cell cluster may be denser than scenarios considered for LTE rel-10 enhanced inter-cell interference coordination (eICIC), 3GPP rel-11 further enhanced ICIC (feICIC)/coordinated multi-point (CoMP) transmission/reception. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 9:
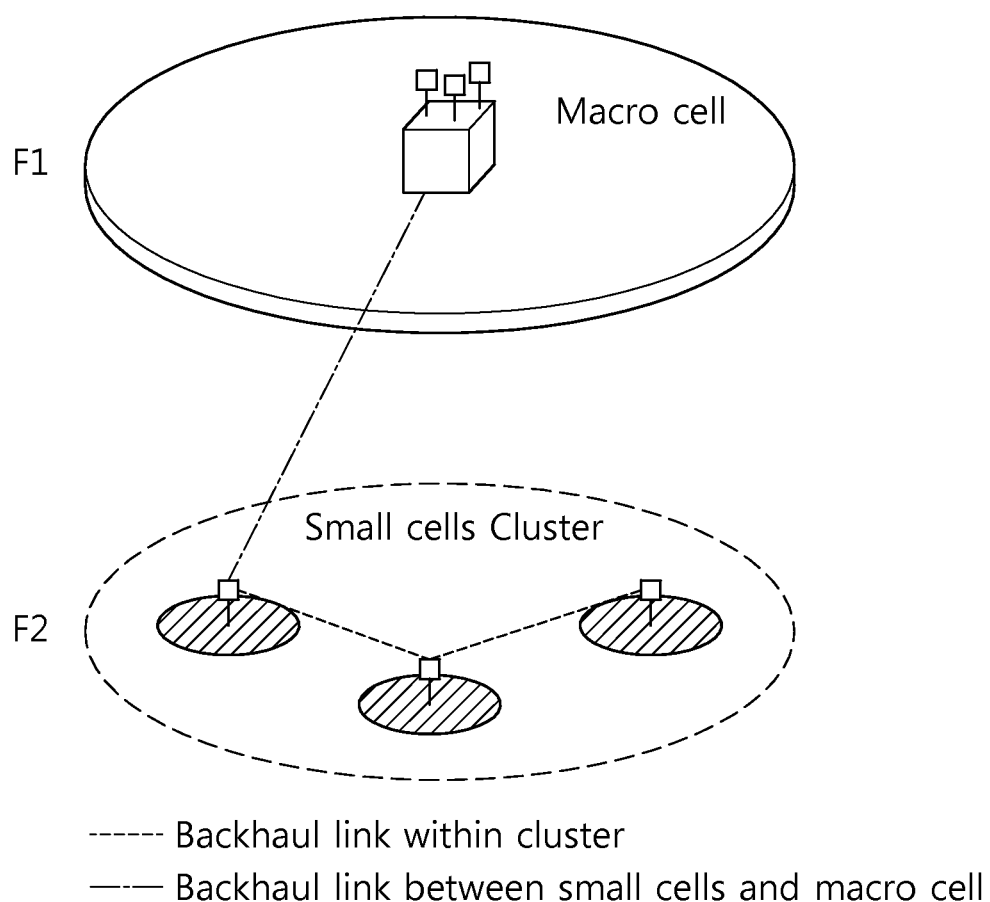
FIG. 9 shows another example of small cell deployment scenario.

FIG. 9 shows another example of small cell deployment scenario. Referring to FIG. 9, small cells are deployed in the presence of an overlaid macro network. The macro cell and the small cells are deployed using different frequencies. That is, the macro cell uses frequency F1, and the small cells use frequency F2. Further, the macro cell and the small cells are deployed in outdoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 10:
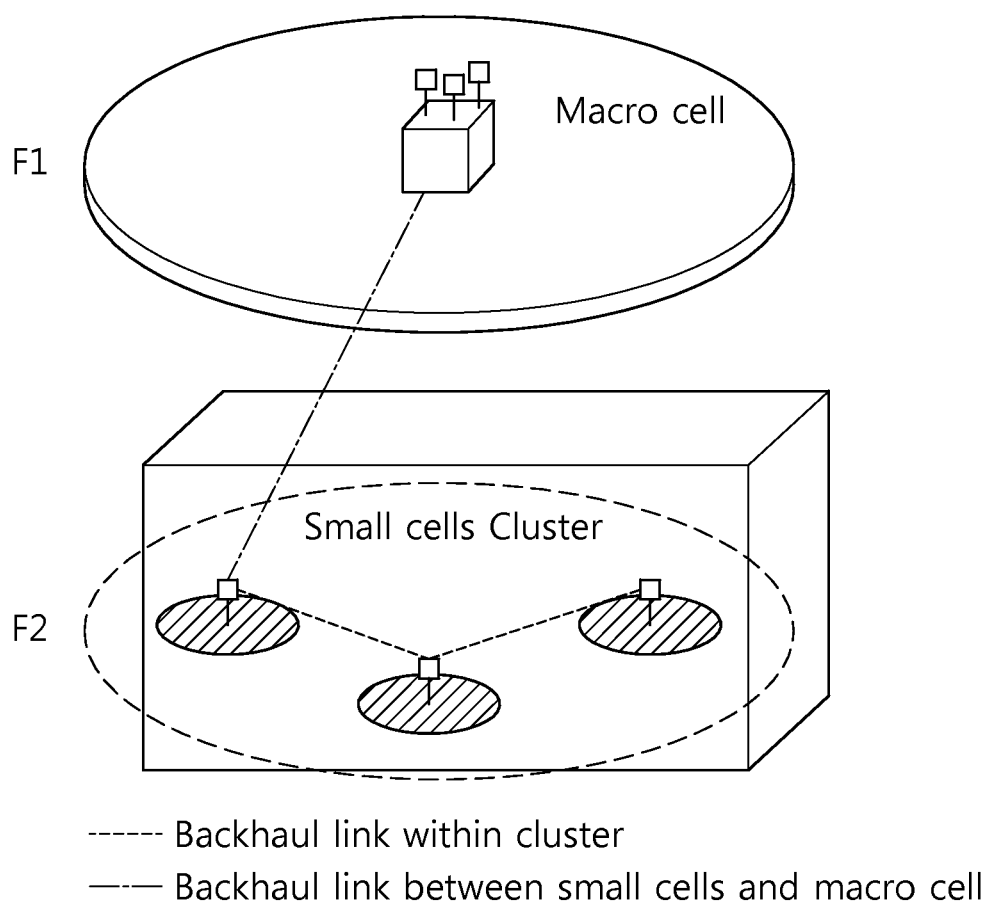
FIG. 10 shows another example of small cell deployment scenario.

FIG. 10 shows another example of small cell deployment scenario. Referring to FIG. 10, small cells are deployed in the presence of an overlaid macro network. The macro cell and the small cells are deployed using different frequencies. That is, the macro cell uses frequency F1, and the small cells use frequency F2. Further, the macro cell is deployed in outdoor, and the small cells are deployed in indoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Alternatively, a sparse scenario may be considered such as the indoor hotspot scenario evaluated for LTE rel-10 scenarios. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 11:
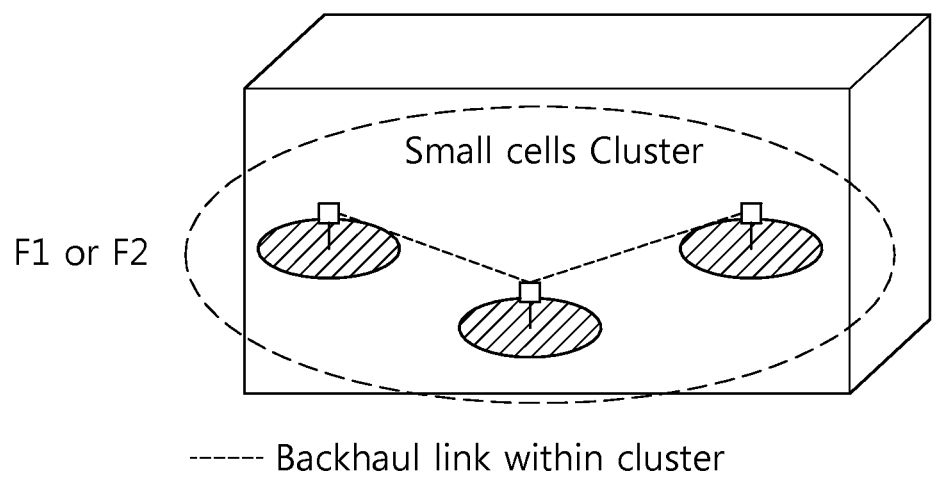
FIG. 11 shows another example of small cell deployment scenario.

FIG. 11 shows another example of small cell deployment scenario. Referring to FIG. 11, macro cell coverage is not present. Small cells are deployed using frequency F1 or F2. Further, the small cells are deployed in indoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Alternatively, a sparse scenario may be considered such as the indoor hotspot scenario evaluated for LTE rel-10 scenarios. Further, both ideal backhaul and non-ideal backhaul may be considered for an interface between the small cells within the same small cell cluster. Further, non-ideal backhaul may be assumed for all other interfaces.

For small cell enhancement, dual connectivity may be supported. By dual connectivity, a UE may be connected to both a master eNB (MeNB, or macro cell eNB) and secondary eNB (SeNB, or small cell eNB).

Figure 12:
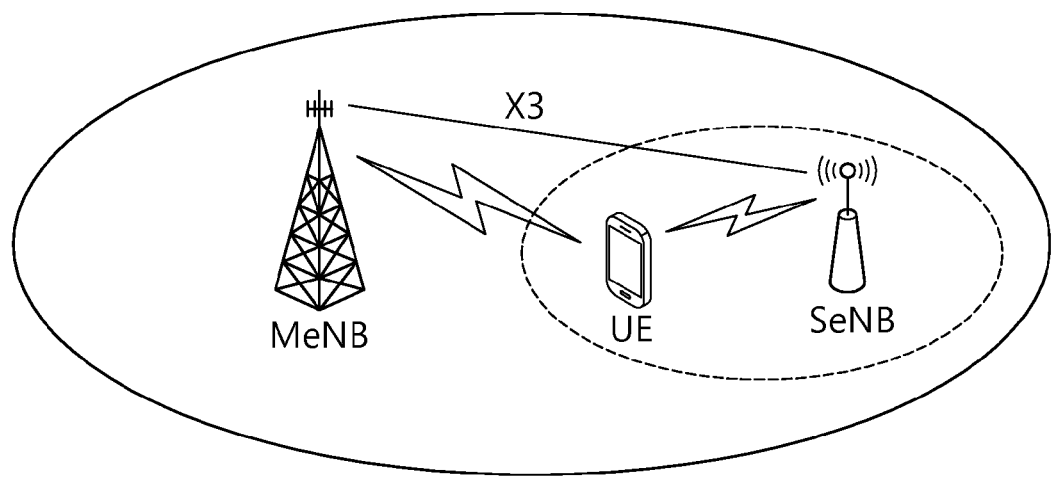
FIG. 12 shows an example of dual connectivity to MeNB and SeNB.

FIG. 12 shows an example of dual connectivity to MeNB and SeNB.

Referring to FIG. 12, the UE has dual connectivity to both the MeNB and SeNB. The MeNB is an eNB that is responsible for managing control plane specific operations, e.g., RRC connection control and mobility. The SeNB is an eNB that is responsible for managing user plane specific operations, e.g., transfer of data on DRBs. The MeNB and SeNB may be different nodes. The MeNB may serve a macro cell. The SeNB may serve a small cell or a group of small cells. The network may configure one RB/channel for the MeNB and another BR/channel for the SeNB. Transfer of data on SRBs may be performed on the MeNB. Transfer of data on DRBs may be performed on either the MeNB or SeNB. Whether path of data on DRBs is on the MeNB or SeNB may be configured by the eNB, MME, or S-GW. There may be an X3 interface between the MeNB and the SeNB that is similar to the conventional X2 interface between eNBs. Because RRC connection reconfiguration is managed by the MeNB, the MeNB may transmit information about DRB configurations to the SeNB via X3 interface. Connectivity means the connection to eNB for data transfer. If the UE is served by one MeNB and one SeNB, it is considered that the UE has one connectivity for the MeNB and another connectivity for the SeNB. The UE may have multiple connectivity for SeNBs when the UE is served by small cells of the different SeNB.

In FIG. 12, it is assumed that dual connectivity is established for different eNBs in 3GPP LTE system, i.e., the MeNB and SeNB. However, dual connectivity may be established for different nodes in different systems. For example, dual connectivity may be established for an eNB in 3GPP LTE system and an access point (AP) in wireless local area network (WLAN) system. In this case, the network may configure one RB/channel for the MeNB and another RB/channel for the AP for a specific IP flow. Or, dual connectivity may be established for an eNB in 3GPP LTE system and a NodeB (NB) in UMTS system. Or, dual connectivity may be established for an eNB in 3GPP LTE system and a new node in any system. However, at least one node constituting dual connectivity may always be an eNB.

If a UE support dual connectivity, the UE may receive traffic via one of connections in dual connectivity. For example, if the UE supports one connection with the 3GPP LTE and another connection with the WLAN, UE may receive user traffic via either the 3GPP LTE or WLAN. If the UE receives/transmits user traffic via the 3GPP LTE, the UE may be inactive for the connection with the WLAN. If the UE receives/transmits user traffic via the WLAN, the UE may be inactive for the connection with the 3GPP LTE. If one of connections in dual connectivity is inactive, the UE may inefficiently maintain two connections with the 3GPP LTE and WLAN.

Hereinafter, a method for transmitting an inactivity indication according to an embodiment of the present invention is described to solve the problem described above. According to an embodiment of the present invention, the UE transmits an inactivity indication which indicates inactivation of a specific bearer/channel in dual connectivity, and accordingly, efficient channel management can be achieved.

Figure 13:
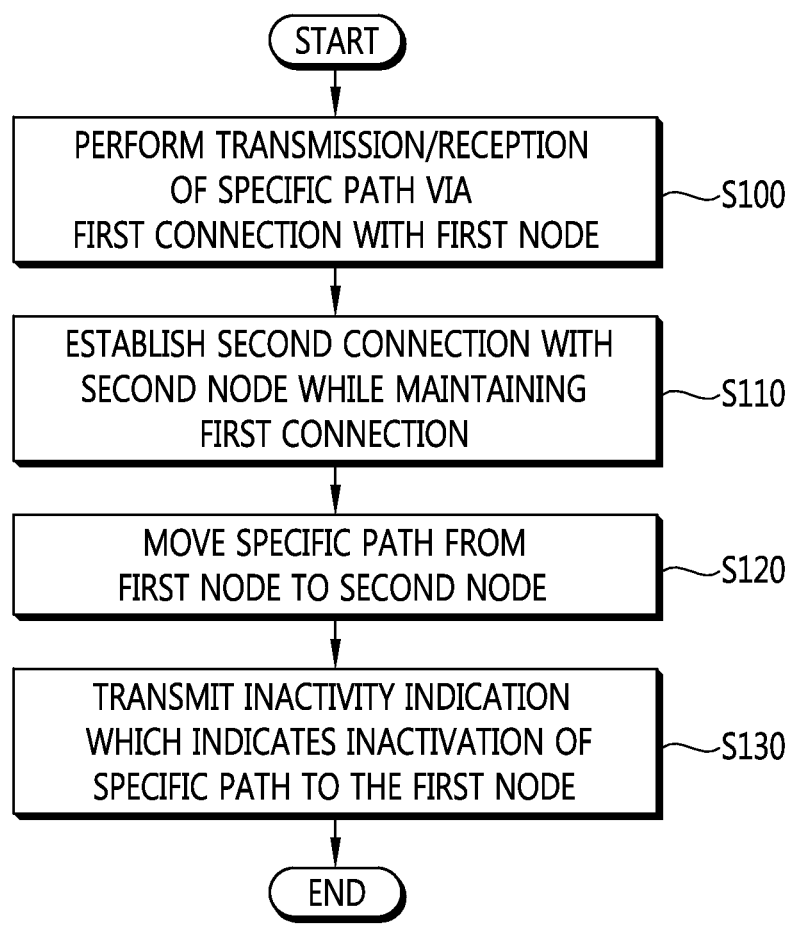
FIG. 13 shows an example of a method for transmitting an inactivity indication according to an embodiment of the present invention.

FIG. 13 shows an example of a method for transmitting an inactivity indication according to an embodiment of the present invention.

In step S100, a UE, which can support dual connectivity, performs transmission or reception of IP packets of a specific path via a first connection with a first node. The specific path may be a specific bearer. For example, the specific bearer may be one of a radio bearer, evolved packet system (EPS) bearer, or an IP flow. Alternatively, the specific path may be a specific channel. For example, the specific channel may be one of a logical channel, a transport channel, or a physical channel.

In step S110, the UE establishes a second connection with a second node while maintaining the first connection. Upon establishing the second connection with the second node, in step S120, the UE moves the specific path from the first node to the second node.

In step S130, the UE transmits an inactivity indication which indicates inactivation (or, deactivation) of the specific path to the first node. The inactivity indication may be transmitted via one of an RRC message, MAC control element (CE), or a L1 signaling. Further, the inactivity indication may include an identity of the specific path. If the specific path is a specific radio bearer, the inactivity indication may include a radio bearer ID. If the specific path is a specific logical channel, the inactivity indication may include a logical channel ID.

Upon receiving the inactivity indication from the UE, the first node may release or deactivate the specific path. Accordingly, the first node may perform an RRC connection reconfiguration procedure or RRC connection release procedure for the UE. Alternatively, the first node may maintain the specific path for the UE (i.e., by maintaining L2 entities such as PDCP/RLC/MAC for the specific path).

In the embodiment described in FIG. 13, the first node and the second node may be eNBs of 3GPP LTE system. Specifically, the first node may be an MeNB, and the second node may be an SeNB. Alternatively, the first node may be an eNB of 3GPP LTE system, and the second node may be an AP of a WLAN system. On the other way, the first node may be an AP of a WLAN system, and the second node may be an eNB of 3GPP LTE system. Alternatively, the first node may be an eNB of 3GPP LTE system, and the second node may be an NB of UTMS system.

Alternatively, an embodiment of the present invention may be applied for carrier aggregation (CA) or LTE in unlicensed band (LTE-U) as well as dual connectivity as described above. For example, when an embodiment of the present invention is applied for the CA, the first connection may be a connection with a primary cell (PCell), and the second connection may be a connection with a secondary cell (SCell). The first/second connections may be provided by one eNB. Alternatively, when an embodiment of the present invention is applied for the LTE-U, at least one of the first/second connections may be a connection provided at an unlicensed band in 3GPP LTE. The first/second connections may be provided by one eNB.

Figure 14:
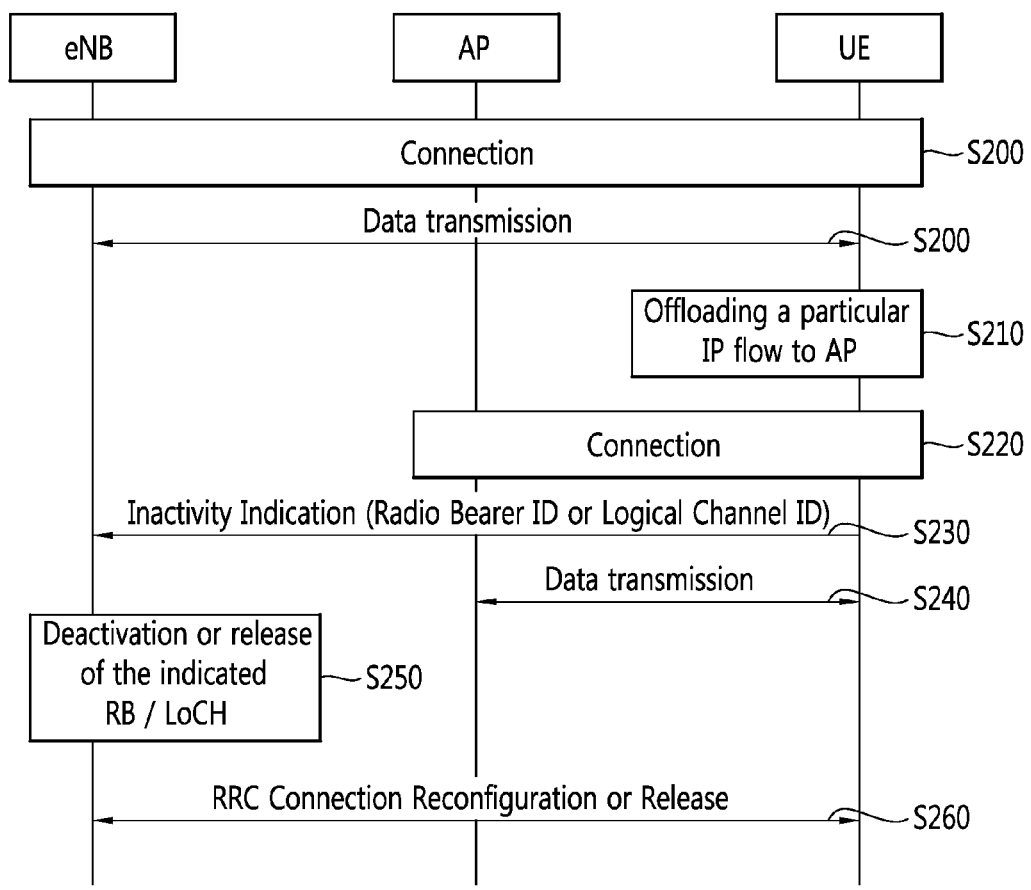
FIG. 14 shows an example of a method for transmitting an inactivity indication according to another embodiment of the present invention.

FIG. 14 shows an example of a method for transmitting an inactivity indication according to another embodiment of the present invention.

In step S200, a UE establishes an RRC connection with an eNB. The UE may establish one or more radio bearers/logical channels for exchange of user traffic with the eNB.

In step S210, the UE transmits user traffic to the eNB or receives user traffic from the eNB via the radio bearer/logical channel.

In step S220, the UE decides to offload a specific IP flow from 3GPP LTE system to WLAN system. Thus, in step S230, the UE establishes another connection with an AP of WLAN system for offloading, and then exchanges user traffic with the AP.

In step S240, the UE informs the eNB of inactivity of the radio bearer/logical channel mapped to the specific IP flow by transmitting an inactivity indication including a radio bearer ID or logical channel ID to the eNB.

In step S250, upon receiving the inactivity indication, the eNB may decide to deactivate or release the radio bearer/logical channel indicated by the UE. In step S260, the eNB may initiate an RRC connection reconfiguration procedure or the RRC connection release procedure for the UE.

Figure 15:
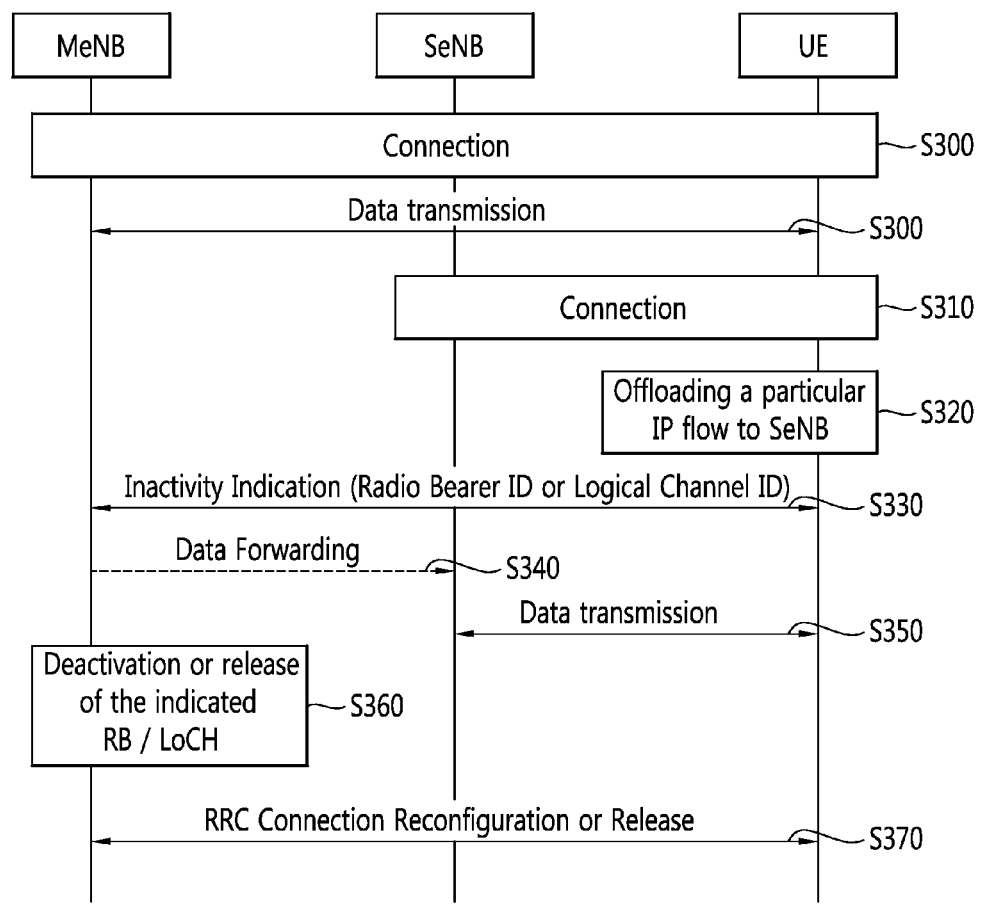
FIG. 15 shows an example of a method for transmitting an inactivity indication according to another embodiment of the present invention.

FIG. 15 shows an example of a method for transmitting an inactivity indication according to another embodiment of the present invention.

In step S300, a UE establishes an RRC connection with an MeNB. The UE may establish one or more radio bearers/logical channels for exchange of user traffic with the MeNB.

In step S310, the UE transmits user traffic to the MeNB or receives user traffic from the MeNB via the radio bearer/logical channel.

In step S320, the UE establishes another connection with an SeNB for offloading.

In step S330, the UE decides to offload a specific IP flow from the MeNB to the SeNB.

In step S340, the UE informs the MeNB of inactivity of the radio bearer/logical channel mapped to the specific IP flow by transmitting an inactivity indication including a radio bearer ID or logical channel ID to the MeNB.

In step S350, upon receiving the inactivity indication, the MeNB may forward user traffic to the SeNB. Also, in step S360, the eNB may decide to deactivate or release the radio bearer/logical channel indicated by the UE. In step S370, the eNB may initiate an RRC connection reconfiguration procedure or the RRC connection release procedure for the UE.

Figure 16:
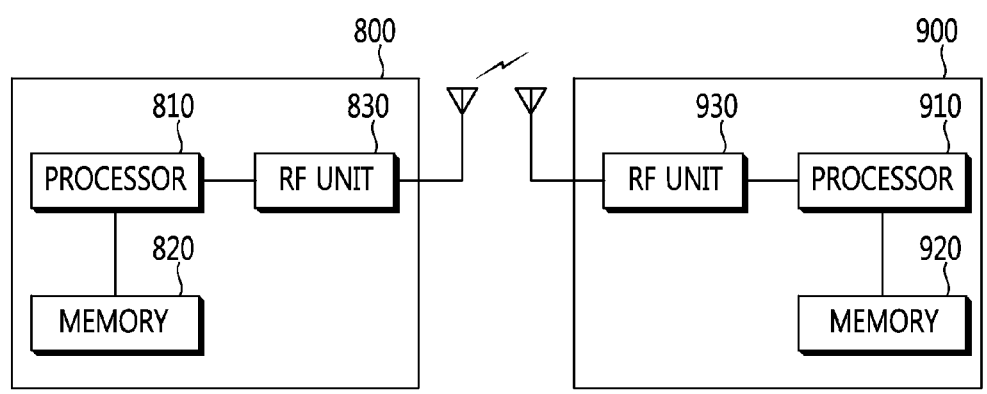
FIG. 16 shows a wireless communication system to implement an embodiment of the present invention.

FIG. 16 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting an inactivity indication in a wireless communication system, the method performed by a user equipment (UE) and comprising:
    performing transmission or reception of Internet protocol (IP) packets via a specific path on a first connection, wherein the first connection is a connection between the UE and a first node;
    determining whether offloading the IP packets from the first node to the second node;
    if offloading the IP packets from the first node to the second node is determined, establishing a second connection while maintaining the first connection, wherein the second connection is a connection between the UE and the second node;
    moving the specific path from the first node to the second node after the establishment; and
    transmitting, to the first node, the inactivity indication, the inactivity indication including an identity of the specific path on the first connection based on whether the establishment for the second connection is complete,
    wherein, if the establishment for the second connection is complete and the UE simultaneously supports both the first connection and the second connection, the UE transmits the inactivity indication, which indicates that the specific path corresponding to the identity on the first connection is inactivated, to the first node.

2. The method of claim 1, wherein the inactivity indication is transmitted via one of a resource control resource (RRC) message, media access control (MAC) control element (CE), or a L1 signaling.

3. The method of claim 1, wherein the specific path is a specific bearer.

4. The method of claim 3, wherein the specific bearer is one of a radio bearer, evolved packet system (EPS) bearer, or an IP flow.

5. The method of claim 1, wherein the specific path is a specific channel.

6. The method of claim 5, wherein the specific channel is one of a logical channel, a transport channel, or a physical channel.

7. The method of claim 1, wherein the first node and the second node are eNodeBs (eNBs) of a $3^{rd}$ generation partnership project (3GPP) long-term evolution (LTE) system.

8. The method of claim 7, wherein the first node is a master eNB (MeNB), and
wherein the second node is a secondary eNB (SeNB).

9. The method of claim 1, wherein the first node is an eNB of a 3GPP LTE system, and
wherein the second node is an access point (AP) of a wireless local area network (WLAN) system.

10. The method of claim 1, wherein the first node is an AP of a WLAN system, and
wherein the second node is an eNB of a 3GPP LTE system.

11. The method of claim 1, further comprising:
performing an RRC connection reconfiguration procedure with the first node after transmitting the inactivity indication.

12. The method of claim 1, further comprising:
performing an RRC connection release procedure with the first node after transmitting the inactivity indication.

13. A user equipment (UE) comprising:
a radio frequency (RF) unit for transmitting or receiving a radio signal; and
a processor coupled to the RF unit, and configured to:
perform transmission or reception of Internet protocol (IP) packets via a specific path on a first connection, wherein the first connection is a connection between the UE and a first node;
determine whether offloading the IP packets from the first node to the second node;
if offloading the IP packets from the first node to the second node is determined, establish a second connection while maintaining the first connection, wherein the second connection is a connection between the UE and the second node;
move the specific path from the first node to the second node after the establishment; and
transmit, to the first node, an inactivity indication including an identity of the specific path on the first connection based on whether the establishment for the second connection is complete,
wherein if the establishment for the second connection is complete and the UE simultaneously supports both the first connection and the second connection, the UE transmits the inactivity indication, which indicates that the specific path corresponding to the identity on the first connection is inactivated, to the first node.

* * * * *